No. 712,928. Patented Nov. 4, 1902.
W. A. HATCHER & J. W. PACKARD.
CONTROLLING DEVICE FOR MOTOR VEHICLES.
(Application filed June 26, 1900.)
(No Model.) 5 Sheets—Sheet 1.
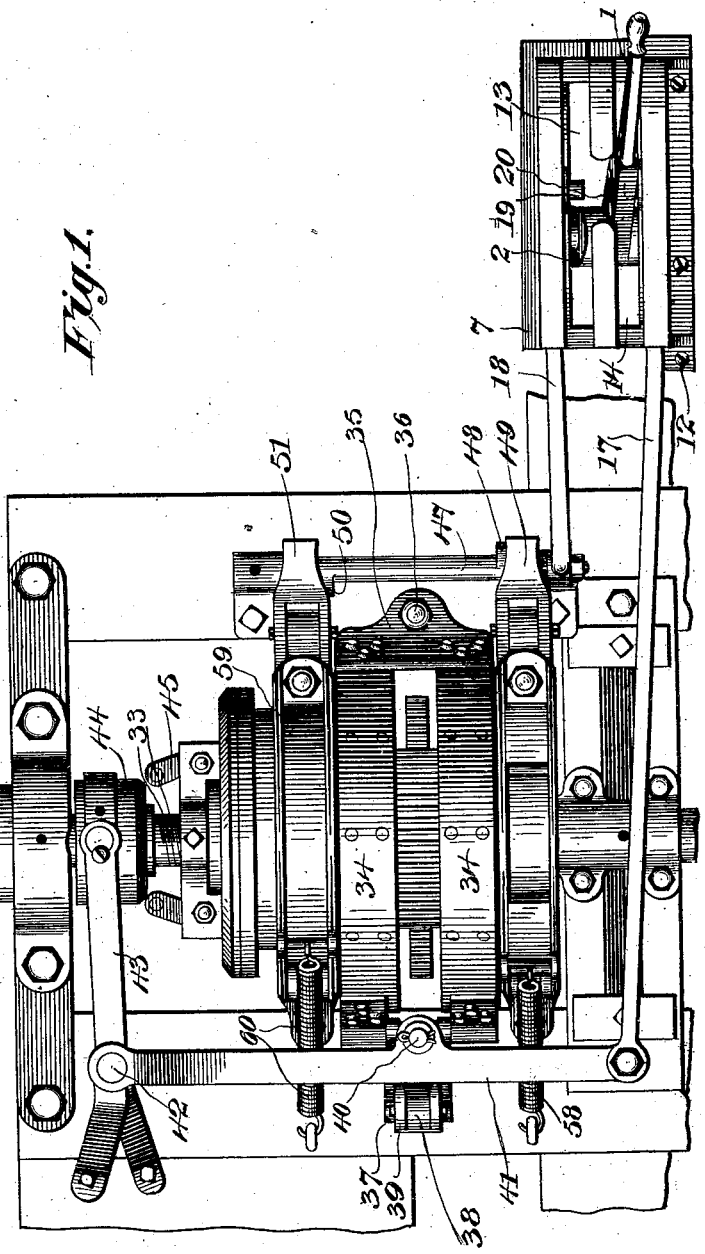
Fig. 1.
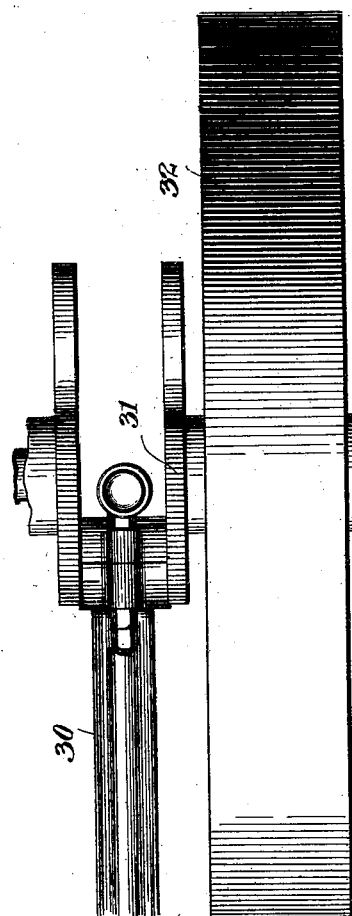
Witnesses
Elmer Seavey.
Arthur L. Bryant
Inventors
W. A. Hatcher and J. W. Packard
By Watson & Watson
Attorneys.

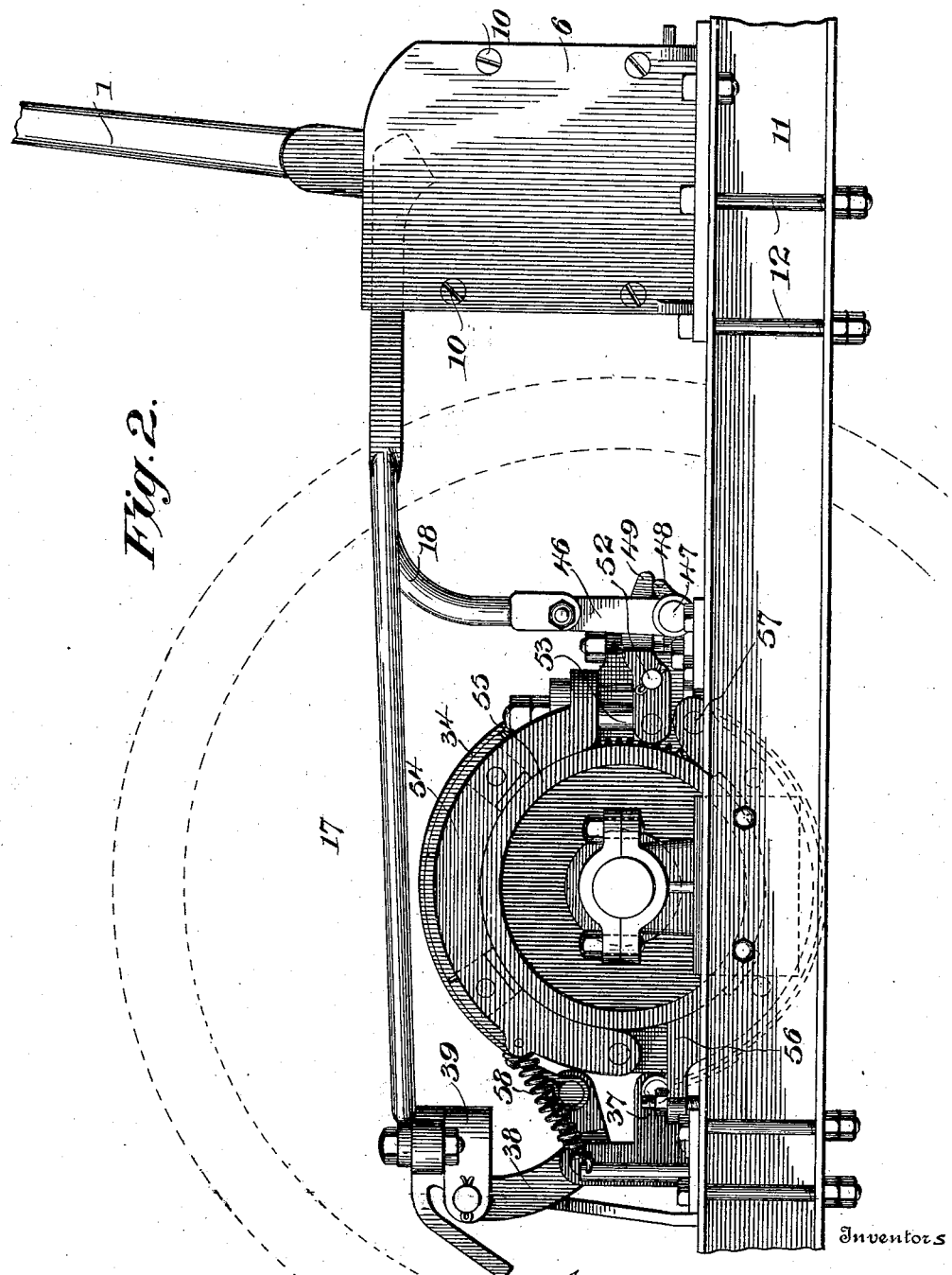

No. 712,928. Patented Nov. 4, 1902.
W. A. HATCHER & J. W. PACKARD.
CONTROLLING DEVICE FOR MOTOR VEHICLES.
(Application filed June 26, 1900.)
(No Model.) 5 Sheets—Sheet 3.
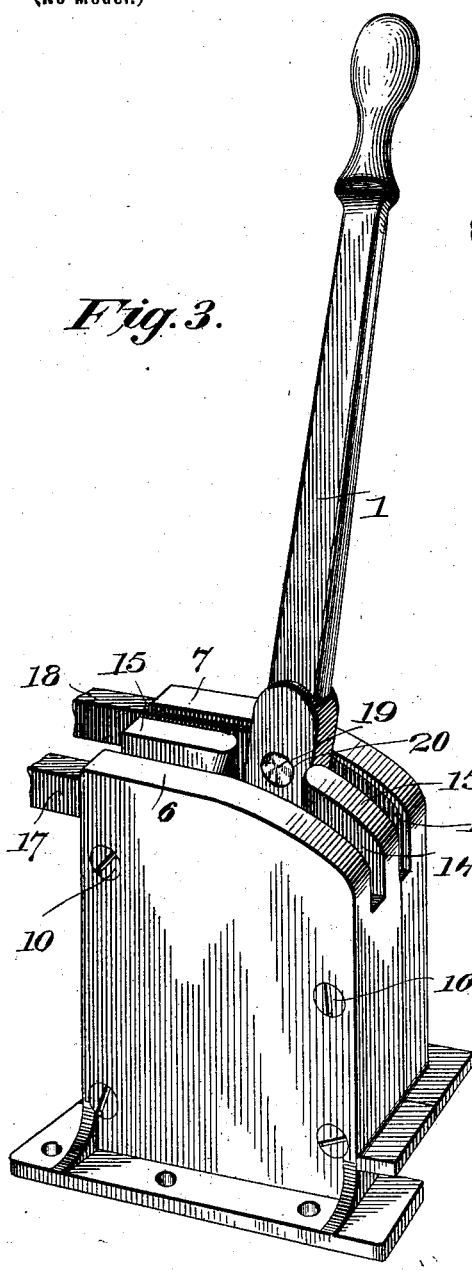
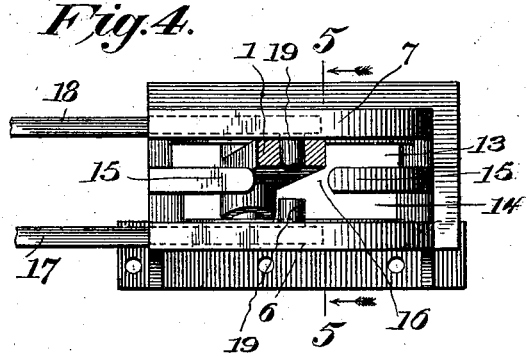
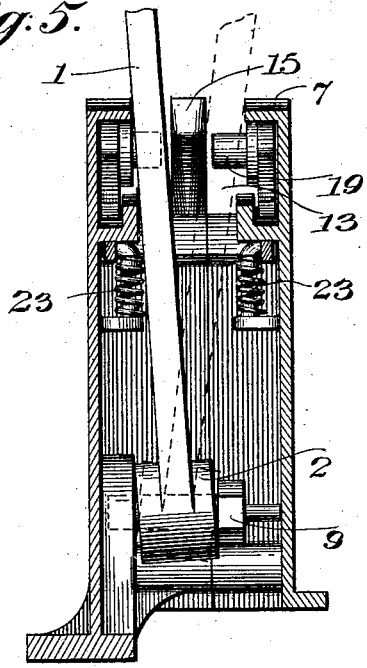
Witnesses
Elmer Seavey,
Arthur L. Bryant
Inventors
W. A. Hatcher & J. W. Packard
By Watson & Watson
Attorneys.

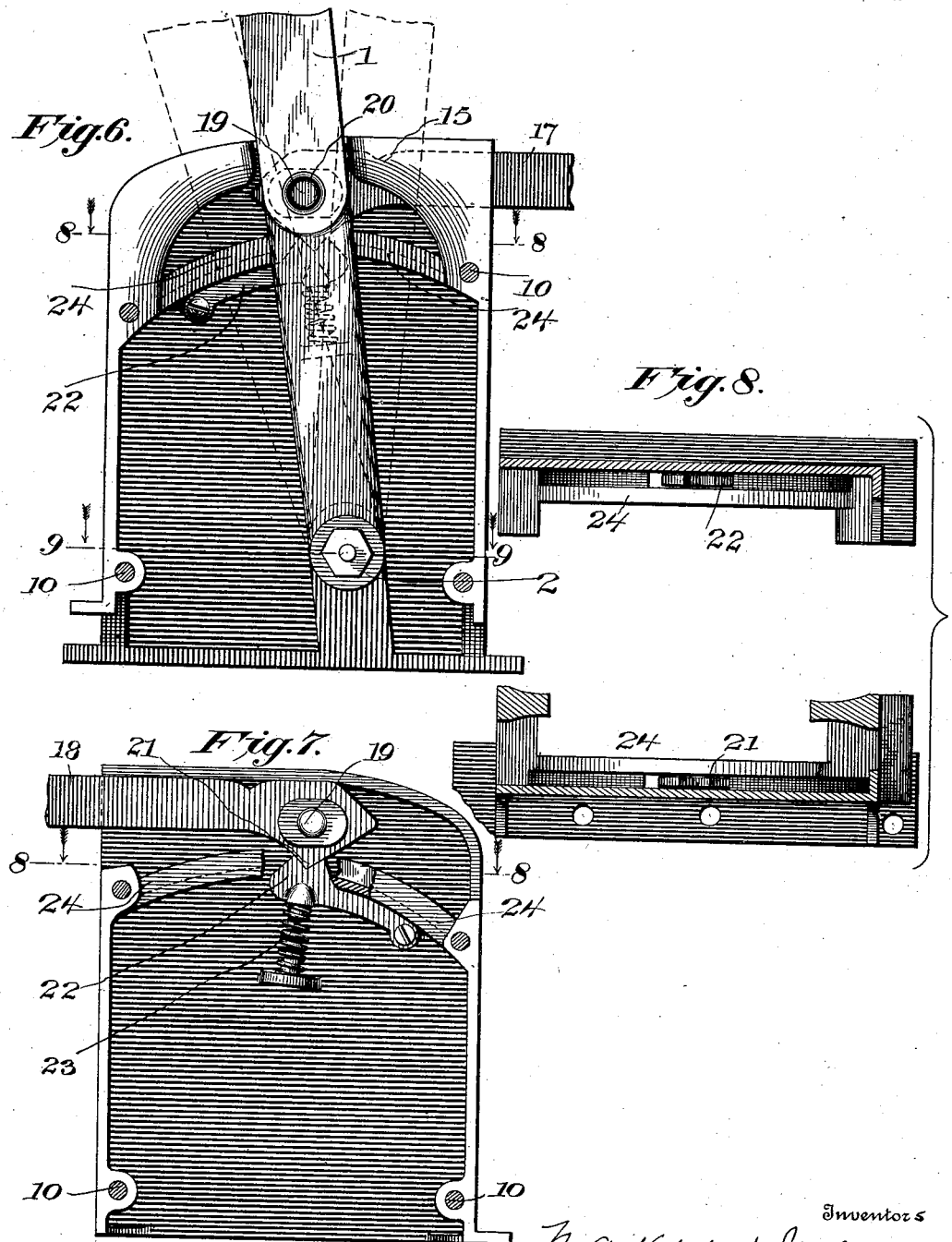

No. 712,928. Patented Nov. 4, 1902.
W. A. HATCHER & J. W. PACKARD.
CONTROLLING DEVICE FOR MOTOR VEHICLES.
(Application filed June 26, 1900.)
(No Model.) 5 Sheets—Sheet 5.

UNITED STATES PATENT OFFICE.

WILLIAM A. HATCHER AND JAMES W. PACKARD, OF WARREN, OHIO, ASSIGNORS, BY DIRECT AND MESNE ASSIGNMENTS, TO OHIO AUTOMOBILE COMPANY, OF WARREN, OHIO, A CORPORATION OF WEST VIRGINIA.

CONTROLLING DEVICE FOR MOTOR-VEHICLES.

SPECIFICATION forming part of Letters Patent No. 712,928, dated November 4, 1902.

Application filed June 26, 1900. Serial No. 21,650. (No model.)

*To all whom it may concern:*

Be it known that we, WILLIAM A. HATCHER and JAMES W. PACKARD, citizens of the United States, residing at Warren, in the county of Trumbull and State of Ohio, have invented certain new and useful Improvements in Controlling Devices for Motor-Vehicles, of which the following is a specification.

This invention comprises various improvements in controlling mechanism for motor-vehicles, and more particularly devices for changing speed, reversing, braking, and otherwise controlling the movement of such vehicles.

The invention will be particularly described in connection with the accompanying drawings, in which—

Figure 9:
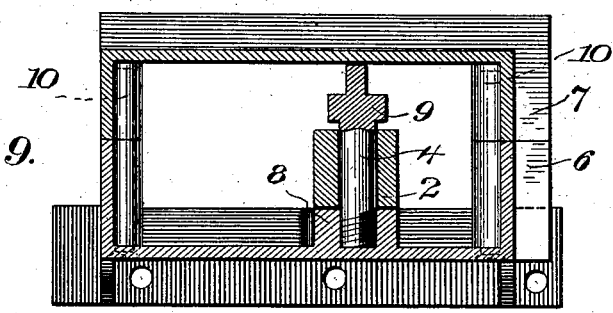
Figure 10:
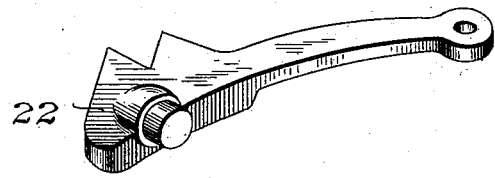

Figure 1 is a plan view of so much of the driving mechanism of a motor-vehicle as is necessary to illustrate the invention. Fig. 2 is a right side elevation of the parts shown in Fig. 1. Fig. 3 is a perspective elevation of the controlling-lever and the parts with which it is directly connected. Fig. 4 is a plan view of the devices shown in Fig. 3, the lever being shown in section. Fig. 5 is a section on the line 5 5 of Fig. 4. Figs. 6 and 7 are inside views of the two parts of the lever-box. Figs. 8 and 9 are sections on the lines 8 8 and 9 9, respectively, of Fig. 6; and Figs. 10, 11, and 12 are details.

Figure 11:
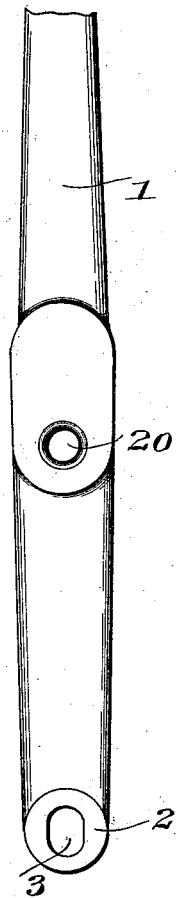
Figure 12:
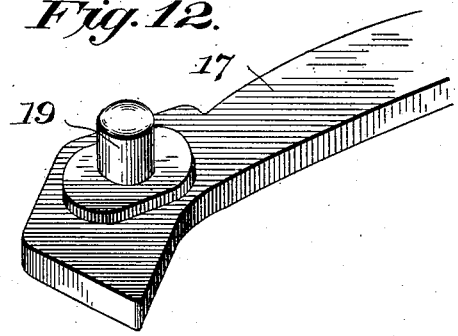

Referring to the drawings, 1 indicates the controlling-lever, which is provided with an enlarged hub 2, having an elongated or elliptical hole 3, which permits the lever to rock laterally upon its pivot-pin 4, Figs. 1, 2, and 11. The lever is mounted in a box or casing comprising two parts 6 7. As shown, the pin 4 is screwed into a socket 8 in the part 6, near the bottom thereof, and it is provided with the shoulder 9 to confine the lever in central position. The two parts of the box are connected by suitable screws or bolts 10, and the box is connected with the frame 11 of the vehicle by means of suitable bolts or other fastenings 12.

Referring to Figs. 3 to 8, inclusive, it will be seen that the box has two slots 13 14 in its top or cover which are separated by a partition 15, said partition having a central opening 16, through which the lever may be rocked laterally from one slot to the other. The partition 15 and the sides of the box form guides for the movement of the lever back and forth in the slots. Extending into the lever-box are two operating links or elements 17 18. These links are provided at their forward ends with inwardly-projecting studs or pins 19, adapted to be engaged by an opening 20 in the lever 1. The forward ends of the links are also provided with projections 21, adapted to coöperate with locking-pawls 22. As shown, the pawls have V-shaped notches, into which the projections 21 fit, and the pawls are held against the links by springs 23. The engagement of the pawls with the links is such that the links may be readily moved in either direction by means of the lever. The pawl, however, is sufficient to hold the link in mid-position when it is not in engagement with the lever, as shown in Fig. 7. The ends of the links travel in guides 24 when they are disengaged from the pawls 22.

The operation of the devices above described is as follows: The lever 1 may be rocked from one guide-slot to the other through the opening 16. When the lever registers with the opening, the projections 21 on the links register with the pawls 22. The lever 1 is therefore capable of moving both the links 17 and 18 in either direction from their normal middle positions in which they are held by the pawls 22. These movements of the links may be made to effect different operations. The series of operations which we prefer to effect and which are illustrated in the drawings are as follows: The forward movement of the lever in slot 13 causes a reversal of the driving mechanism and a backing of the vehicle. By shifting the lever into the rear end of slot 13 a slow forward movement is given to the vehicle. A forward movement of the lever in slot 14 applies the brake and stops the vehicle, and a rearward movement of the lever in said slot gives a fast forward movement to the vehicle. It will thus be seen that with a single lever and very simple connections we produce four distinct effects, those illustrated being a slow forward movement ahead, a rapid movement in the same direction, backing, and applying the brake. The driving mechanism to which the links 17 and 18 are connected may be of any suitable form. That shown in the drawings is quite similar to that shown in a pending application filed by W. A. Hatcher, January 16, 1900, Serial No. 1,665. We will herein give a brief outline of said mechanism, a detailed description of the same not being deemed necessary for the purposes of the present application.

Referring to Figs. 1 and 2, 30 indicates the connecting-rod of an engine or motor; 31, the crank; 32, a fly-wheel, and 33 a power-shaft driven from the fly-wheel. In the embodiment of the invention shown the motor is presumed to run constantly, and the driving-gears are connected and disconnected by means of suitable devices. Two brake-bands 34 are used, each consisting of an upper and and lower section. The rear end of the lower section is fixed to the frame at 37, and the forward ends of the two sections are adjustably connected together by means of plates 35 and the bolt 36. The rear end of the upper section of each band is connected to the horizontal arm of an elbow-lever 38. The lever 38 has connected to it a block or yoke 39, which carries a pin 40 engaging with a brake-lever 41, which is connected to the link 17. Lever 41 is mounted on a fixed pivot 42 and has an arm 43, connected to a clutch-block 44. When link 17 is drawn forward, the levers 41 and 38 draw the brake-bands 34 together and apply the brake with considerable power. When the link 17 is moved backward, the brake is thrown off, and the clutch-block 44 is thrown into engagement with clutching-arms 45, the effect of which is to connect the motor directly to the running-gear and impart a fast speed ahead to the vehicle. These effects are produced by the lever 1 working in the slot 14 of the lever-box. The link 18 is connected to an arm 46 upon a rock-shaft 47. The shaft 47 has a forwardly-projecting toe or cam 48, extending under the lever 49, and a rearwardly-extending toe or cam 50, engaging the under side of a lever 51. When the link 18 is moved rearward, cam 48 rocks lever 49 upon its fixed pivot 52, and through bolt 53 brake-shoe 54 is drawn into engagement with flange 55. The rear end of upper shoe 54 is connected pivotally to the under shoe 56, which under shoe is pivoted at its forward end to the fixed pivot 57. A spring 58 disengages the shoes 54 and 56 when the link 18 is returned to normal position.

When link 18 is moved forward, cam 50 operates lever 51 and applies brake-shoes 59 exactly as the shoes 54 and 56 are applied by cam 49. These shoes are released by springs 60 and 58. The effect of the application of the shoes 59 is to reverse the direction of the driving-gear and back the vehicle.

Having described our invention, what we claim as new, and desire to secure by Letters Patent, is—

1. The combination with mechanism for controlling the movement of a motor-vehicle, of a plurality of operating elements therefor, a lever for moving said elements, and means preventing engagement of said lever with either operating element except when both said lever and the element to be engaged are respectively in intermediate positions.

2. The combination with mechanism for controlling the movement of a motor-vehicle, of a plurality of operating elements therefor, and a lever common to all of said elements, means for normally holding each of said elements in an intermediate position, and means for positively engaging the lever with any one of said elements while the latter is in said intermediate position, said lever being thus adapted to move any particular element in either of two directions.

3. The combination with mechanism for controlling the movement of a motor-vehicle, of two operating-links therefor, means for normally holding each of said links in an intermediate position, and a lever mounted between and adapted to be moved laterally into engagement with either of said links and to move the engaged link longitudinally in either direction from its normal intermediate position.

4. The combination with mechanism for controlling the movement of a motor-vehicle, of two operating-links therefor, a lever adapted to engage with either of said links while in its central position, means for preventing disengagement of the lever from its engaged link excepting when said link is in normal central position, and means for yieldingly holding each of said links in normal central position.

5. In a controlling mechanism for motor-vehicles, the controlling-lever and the operating-links, in combination with a box in which said lever is fulcrumed, said box having two parallel guide-slots for the lever and a wall between said guide-slots having an opening intermediate its ends, said lever being movable through said opening and to and from either extremity of either guide-slot whereby it is made to assume four different positions and effect four distinct functions, for the purpose set forth.

6. In a controlling mechanism for motor-vehicles, the combination with a lever having a rocking movement and a lateral movement upon its pivot, of two parallel slotted guides for the lever having an opening between them midway of their length through which the lever may pass from one guide to the other, and two operating-links adapted to engage alternately with said lever, the lever being adapted to rock toward either extremity of either guide from its position in alinement with said opening, for the purpose set forth.

7. In a controlling mechanism for motor-vehicles, the combination of two operating-links, two spring-pawls arranged to engage said links when the latter are in mid-position, and a pivoted lever arranged between said links and having a rocking and a lateral movement, the lateral movement of the lever adapting it to engage with either of said links, and means for preventing such lateral movement of the lever except when the links are engaged by said pawls.

8. In a controlling mechanism for motor-vehicles, the combination of the lever-box having two parallel slots in its upper end connected by a central opening in the partition-wall, a lever adapted to rock upon its pivot in opposite directions from said central opening in either of said slots and to move laterally from one slot to the other, operating-links connecting the power mechanism with the lever-box, and means for engaging the lever with either of said links, for the purpose set forth.

9. In a controlling mechanism for motor-vehicles, the combination with the links 17, 18 provided with studs at their forward ends, of the lever-box in which the forward ends of said links are located, guides in said box for said links, a lever pivotally mounted within the box and provided with an opening adapted to engage the studs upon the links, and means for locking the links yieldingly in mid-position in the box, said links being movable in either direction from mid-position by means of said lever, for the purpose set forth.

10. In a motor-vehicle, the combination with two independent sets of means controlling the brake, the low and high gears and the reverse-gear, each set performing a double function, of a single lever for independently actuating each set of means, as set forth.

11. In a motor-vehicle, the combination with two independent sets of means controlling the brake, the low and high gears and the reverse-gear, each set performing a double function, of a single lever for actuating each set of means, and means for holding one set practically immovable while the other set is being so actuated, substantially as set forth.

12. In a motor-vehicle, the combination with two rods for controlling the brake, the low and high gears and the reversing-gear, each rod performing a double function, of a single lever for actuating both rods, connecting means between the lever and each rod, and means for guiding the lever when actuating either rod, substantially as set forth.

In testimony whereof we affix our signatures in presence of two witnesses.

WILLIAM A. HATCHER.
JAMES W. PACKARD.

Witnesses:
M. S. ANDREWS,
ROBT. E. GORTON.